United States Patent

[11] 3,543,714

[72] Inventors Tatsumi Torii;
 Toshiyuki Kondo, Kariya, Aichi, Japan
[21] Appl. No. 842,925
[22] Filed July 18, 1969
[45] Patented Dec. 1, 1970
[73] Assignee Aisin Seiki Kabushiki Kaisha
 Kariya, Aichi Pref., Japan
[32] Priority July 20, 1968
[33] Japan
[31] 43/62,160

[54] BRAKE LINING WEAR WARNING DEVICE
 12 Claims, 5 Drawing Figs.
[52] U.S. Cl. .................................................. 116/67;
 181/1
[51] Int. Cl. .................................................. G08b 3/00
[50] Field of Search ............................ 116/25, 67,
 114, 144; 181/1(A), 73

[56] References Cited
 UNITED STATES PATENTS

| | | | |
|---|---|---|---|
| 1,239,426 | 9/1917 | Aufiero .................. | 116/144 |
| 1,240,156 | 9/1917 | Sparks .................. | 116/144UX |
| 3,139,063 | 6/1964 | Rinkerman ............ | 116/67 |
| 3,168,167 | 2/1965 | Walther ................. | 188/73 |
| 3,267,900 | 8/1966 | Saylor .................... | 116/67 |

Primary Examiner—Louis J. Capozi
Attorney—Pierce, Scheffler & Parker

ABSTRACT: A brake lining wear warning device for use on an automotive vehicle, wherein a ratchet wheel is rotatably mounted on the brake shoe, and when the brake lining is worn below a predetermined minimum level during a successive brake application, said ratchet wheel comes into direct engagement with the rotating brake drum, thereby generating an audible sound to apprise a vehicle operator of excessive brake lining wear.

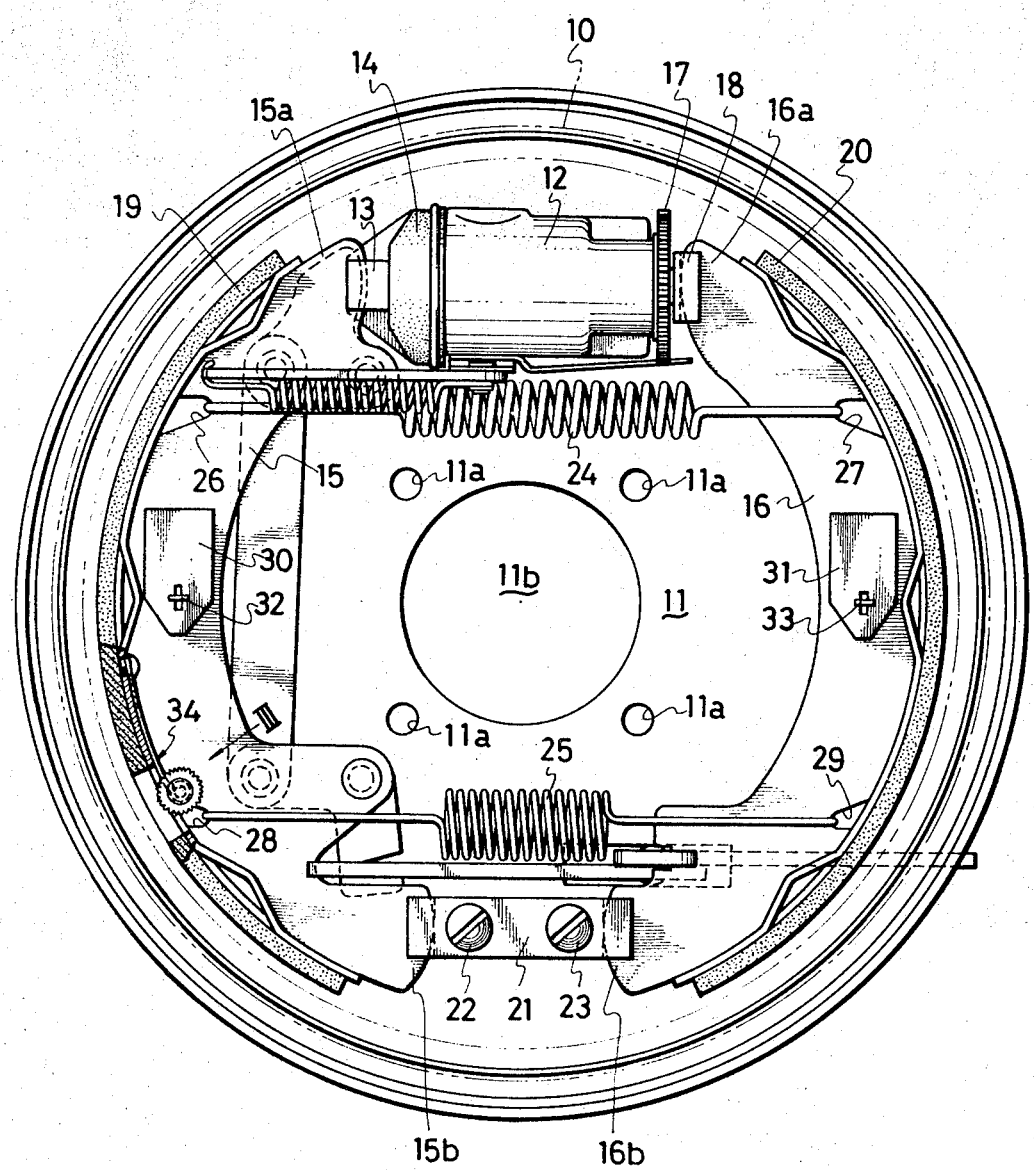

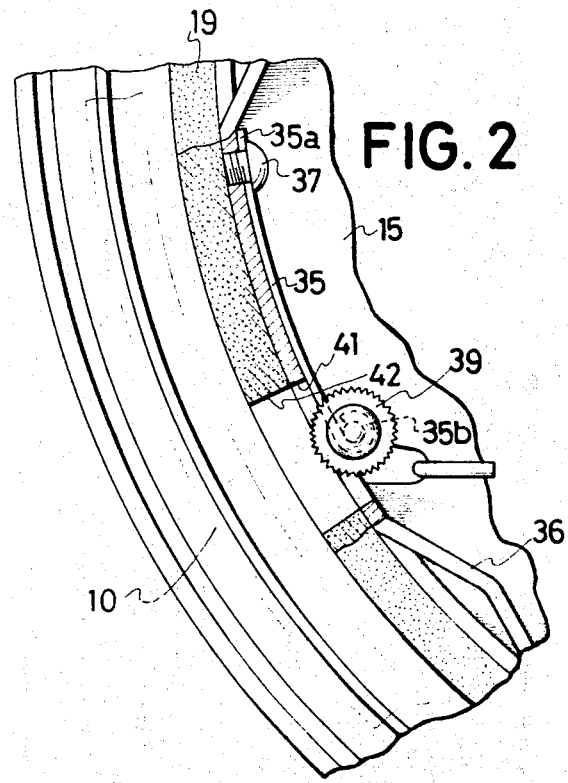
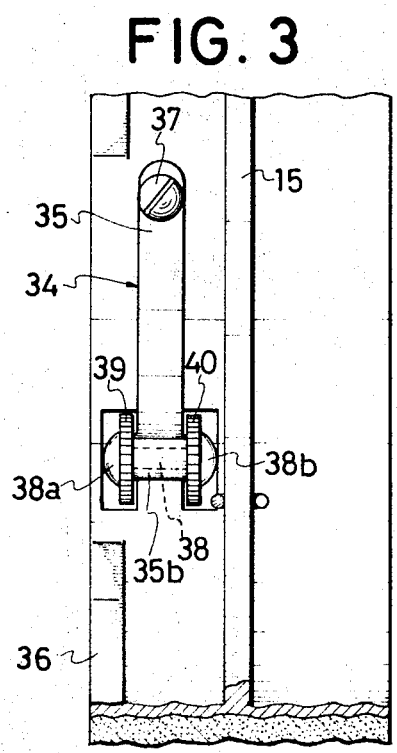
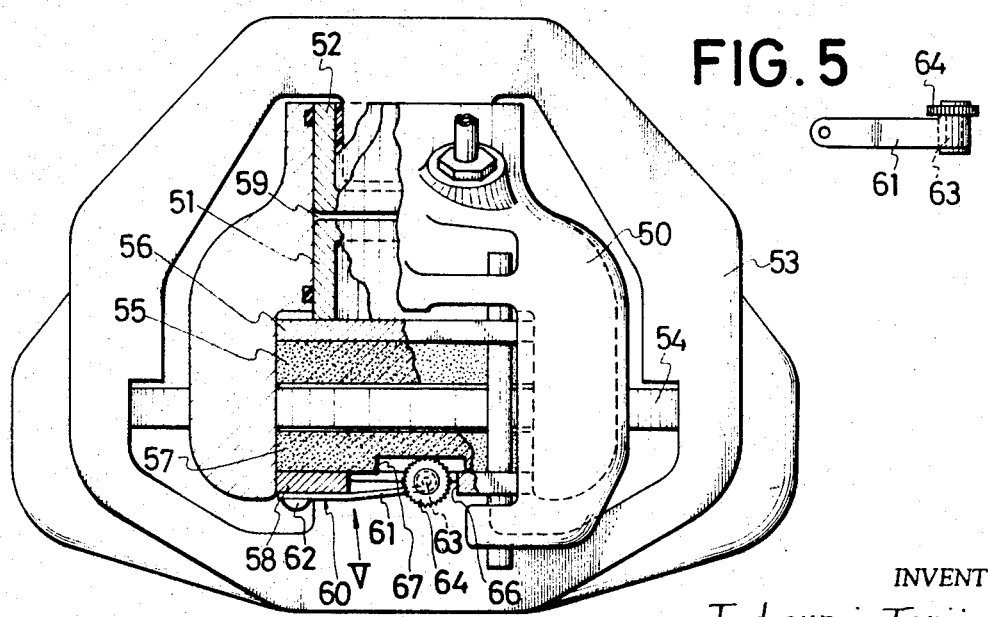

BRAKE LINING WEAR WARNING DEVICE

BACKGROUND OF THE INVENTION

This invention relates to vehicle braking assemblies, and more particularly to a warning device for use with a vehicle brake lining to inform a vehicle operator of excessive brake lining wear.

It is well known to the applicants to use the brake lining warning device which consists of a rotatable wheel, a ratchet wheel rigidly connected thereto through a shaft and a resilient strip engaged said ratchet wheel. When lining wear progresses during repeated brake applications, said rotatable wheel is moved into engagement with a brake drum to rotate said ratchet wheel against the biasing force of said resilient strip to provide an audible sound.

We know well, too, the warning device which comprises a self-contained unit onto the brake shoe, that is to say, a frictional wheel, a clacker wheel secured thereto by a shaft and a spring finger means. When the lining is worn below a predetermined minimum level, said frictional wheel comes into engagement with the drum whereupon rotation of said friction wheel imparts a rotation to said clacker wheel to produce an audible signal by said spring finger means.

These prior devices, however, require many moving parts and therefore are very difficult to assemble and not economical to manufacture.

SUMMARY OF THE INVENTION

It is a principal object of the present invention to overcome the above mentioned difficulties in the prior arts by providing an improved brake lining wear warning device, adapted not only to a drum brake, but also to a disk brake, which provides to a vehicle operator an audible sound indicating the need for relining the brake shoe.

According to the present invention, briefly summarized, there is provided a warning device having rotatable means to come into direct engagement with the rotating drum or disk to generate an audible sound when said lining wear has progressed past a predetermined minimum point.

The nature, principles, details and utility of the invention will be more clearly apparent from the following detailed description with respect to examples of preferred embodiment of the invention when read in conjunction with the accompanying drawings.

BRIEF DESCRIPTION OF THE DRAWINGS

In the drawings:

FIG. 1 is a front elevational view, partly in section, of the drum brake including a lining wear warning device showing one embodiment of this invention;

FIG. 2 is an enlarged view of the warning device of FIG. 1;

FIG. 3 is a view in the direction of arrow III of FIG. 1;

FIG. 4 is a plan view, partly in section, of the disk brake equipped with the warning device showing a modification of this invention; and FIG. 5 shows only the warning device seen from the arrow V of FIG. 4.

DETAILED DESCRIPTION

Referring now more in detail to the drawings and having reference first to FIGS. 1 to 3 thereof, a brake drum 10 shown in chain-dotted line is rotatable in unison with a wheel (not shown); said drum 10 being fixed to the outer end of a rotatable rear axle shaft (again not shown) of an automotive vehicle. Numeral 11 represents a backing plate having four bolt holes 11a and fixedly carried on an axle bearing (not shown) which is passed through a central bore 11b. Said holes 11a are adapted for receiving respective fixing bolts (not shown) for fixingly attaching said plate 11 to a stationary housing of said bearing receiving rotatably said axle shaft. Numeral 12 represents a hydraulic wheel cylinder assembly slidably mounted on said backing plate 11. Said cylinder assembly 12 is provided with a hydraulic piston 13, only the extreme rod portion thereof being represented in FIG. 1, which is arranged slidably in said cylinder 12. Dust keeper 14 is made of rubber and fixed to the left-hand end of said cylinder when seen in FIG. 1. At the right-hand end of said cylinder 12, there is mounted a usual means for adjusting the clearance between said brake drum 10 and a pair of brake shoes 15 and 16, said adjusting means comprising an adjusting wheel 17 and an adjusting bolt 18. Said brake shoes 15 and 16 are formed into arcuate rigid arms as shown, and frictional linings 19 and 20 are attached fixedly on the outer arcuate surfaces of said shoes 15 and 16, respectively, such as by means of glue or the like attaching agent, as conventionally. The upper and inner extremity 15a of said one shoe 15 is kept in pressure engagement with channel-shaped part of said piston 13, while the lower end 15b thereof is rockably and vertically slidably connected to the left-hand end of a stationary anchor 21 which is fixed to said backing plate 11 by means of set screws 22 and 23; the upper and inner extremity 16a of said other shoe 16 is in engagement with a U-shaped slot at the right-hand end of said adjusting bolt 18, while the lower end 16b thereof is connected to the right-hand end of said anchor 21 in the similar manner of connection of said one lower end 15b. Thus, said shoe ends 15b and 16b are slidable to a certain extent up or down in FIG. 1, as well as pivotable in the plane of the drawing paper. The upper and lower ends of said brake shoes 15 and 16 are connected by means of return springs 24 and 25 respectively. The opposite ends of said return springs are retained by recessed portions 26 to 29. Numerals 30 and 31 represent U-shaped leaf springs for preventing axial frontward movement of said brake shoes 15 and 16, and are held by pins 32 and 33 projected from said backing plate 11. When the fluid under pressure is supplied in said cylinder 12, said braking shoes 15 and 16 are extended by said pistons 13 and cylinder 12, respectively, to press said two linings 19 and 20 to said rotating drum 10 so that the braking operation is accomplished.

The present invention is clearly illustrated in FIGS. 2 and 3 wherein a warning device 34 includes a resilient support member 35 connected at one end 35a thereof to a flange 36 of said brake shoe 15 by a fixing screw 37. The other end 35b thereof is curved to rotatably embrace a shaft 38 securely mounting a pair of ratchet wheels 39 and 40 at both sides thereof, though said other end 35b is also capable of rigidly embracing said shaft 38 rotatably mounting said ratchet wheels 39 and 40. Each extreme portion 38a and 38b of said shaft 38 is constructed as stopper to prevent said ratchet wheels 39 and 40 from axially escaping. It is understood that said ratchet wheels 39 and 40 are rotatable in unison with said shaft 38, though if said shaft 38 mounts said ratchet wheels 39 and 40 rotatably with respect thereto, only said wheels 39 and 40 rotate.

An aperture 41 in said flange 36 and aperture 42 in said lining 19 combine to receive said ratchet wheels 39 and 40 having a plurality of teeth on the circumferences thereof.

As said linings 19 and 20 are repeatedly driven into engagement with said rotatable drum 10 in successive brake applications, wear occurs on said linings 19 and 20. When the wearing amount of said linings 19 and 20 is within a predetermined minimum level, said warning device 34 is not actuated, since said ratchet wheels 39 and 40 are not as yet capable of making a touching contact with the drum. When said brake linings 19 and 20 are worn thin enough to bring said two ratchet wheels 39 and 40 into contact with said rotatable drum 10, said wheels 39 and 40 are forced to rotate against said drum 10 at the time of braking, thereby producing a high-pitched recurring or repetitive audible sound, creating a persisting warning noise which the vehicle operator finds difficult to ignore and which warns him of the need of checking his brake lining for replacement.

Now referring to FIGS. 4 and 5, a spot-type disk brake includes a hydraulic cylinder body 50 rigidly carried on a stationary member (not shown) at the one side of a brake disk 54, two opposite pistons 51 and 52 slidably mounted in said cylinder body 50 and a movable member 53. One friction lining 55 and backing plate 56 rigidly connected thereto are placed at one side of said disk 54; and the other friction lining 57 and backing plate 58 being placed at the other side thereof.

Numeral 60 indicates a lining wear warning device having a structure similar to said warning device 34 shown is FIGS. 1 to 3, but a modification is clearly found in FIG. 5; this warning device comprises only one ratchet wheel thereon. One end of a resilient support member 61 is secured to said other backing plate 58 by means of a screw 62, while the other end thereof rotatably holds a shaft 63 rigidly mounting a rotatable ratchet wheel 64 at one end thereof. Said other backing plate 58 is provided an aperture 66 and said other lining 57 is provided a recess 67 for receiving said ratchet wheel 64.

When the fluid under pressure is supplied in a chamber 59 provided between said two pistons 51 and 52, said one piston 51 engages and press said one backing plate 56 and lining 55 to one side of said disk 54 while said other backing plate 58 and lining 57 are pressed to the other side of said disk 54 by said other piston 52 through said movable member 53. As said linings 55 and 57 are repeatedly used during a successive brake application, wear occurs on said linings 55 and 57 similar to said linings 19 and 20 of the drum brake. When the wear amount of said linings 55 and 57 is beyond a predetermined minimum level, said ratchet wheel 64 rotationally engages the other side of said brake disk 54, thereby creating a relining warning audible signal.

It is understood that said lining 57, different from said lining 19 of FIGS. 1 to 3, covers over said ratchet wheel 64 when the lining wear amount is within a predetermined minimum level, so that the effective frictional engagement between said lining and disk is attained, and one ratchet wheel 64 produces a sufficient audible noise, though not so loudly as a pair of ratchet wheels as shown in FIGS. 1 to 3. It will be apparent that the difference of teeth pitches on said two ratchet wheels creates two kinds of wave lengths, thereby generating a unique, combined noise which orders a driver not to affect further braking actions, and that there are no needs to provide apertures or recess in said shoe and lining when said warning device is attached to the extreme portion of said shoe.

We claim:

1. In a brake lining wear warning device for informing the operator of a vehicle by way of an audible signal that the lining has worn down to the point where it should be replaced, the lining being applied to a brake shoe cooperative with a rotatable brake member secured upon the wheel of the vehicle such as a brake drum or disc, the combination comprising a support member connected at one end to said brake shoe, at least one audible signal generating wheel having a toothed rim, and a shaft carried by the other end of said support member and mounting said signal generating wheel thereon for rotation, said signal generating wheel being normally out of contact with the rotatable brake member when said brake lining is relatively unworn but establishing contact with said rotatable brake member when said lining has worn to a predetermined degree of thinness thereby to set said signal generating wheel into rotation and itself produce an audible signal as a result of its toothed rim structure.

2. A brake lining wear warning device as defined in claim 1 wherein said audible signal generating wheel is mounted on the other end of said support shaft which is free.

3. A brake lining wear warning device as defined in claim 2 wherein said shaft is carried by said free end of said support member rotatably with respect thereto and said audible signal generating wheel is mounted on said shaft nonrotatably with respect thereto.

4. A brake lining wear warning device as defined in claim 2 wherein said shaft is carried by said free end of said support member nonrotatably with respect thereto and said audible signal generating wheel is mounted on said shaft rotatably with respect thereto.

5. A brake lining wear warning device as defined in claim 2 wherein said shaft is carried by said free end of said support member rotatably with respect thereto and said audible signal generating wheel is mounted on said shaft also rotatably with respect thereto.

6. A brake lining wear warning device as defined in claim 1 wherein a pair of said audible signal generating wheels are provided and which are mounted on opposite ends of said shaft.

7. A brake lining wear warning device as defined in claim 6 wherein said shaft is carried by said support member rotatably with respect thereto and said pair of audible signal generating wheels are mounted on said shaft nonrotatably with respect thereto.

8. A brake lining wear warning device as defined in claim 6 wherein said shaft is carried by said support member nonrotatably with respect thereto and said audible signal generating wheels are mounted on said shaft rotatably with respect thereto.

9. A brake lining wear warning device as defined in claim 6 wherein said shaft is carried by said support member rotatably with respect thereto and said audible signal generating wheels are mounted on said shaft also rotatably with respect thereto.

10. A brake lining wear warning device as defined in claim 6 wherein the respective pitches of the teeth on said pair of audible signal generating wheels differ from each other.

11. A brake lining wear warning device as defined in claim 1 wherein apertures are provided both in said brake shoe and in said lining for receiving said audible signal generating wheel.

12. A brake lining wear warning device as defined in claim 1 wherein said lining is provided with a recess and said brake shoe is provided with an aperture alined with the recess in said lining for receiving said audible signal generating wheel.